United States Patent
Rebbeor et al.

(10) Patent No.: US 12,479,907 B2
(45) Date of Patent: Nov. 25, 2025

(54) METHOD FOR OBTAINING ALPHA-1 PROTEINASE INHIBITOR

(71) Applicant: GRIFOLS WORLDWIDE OPERATIONS LIMITED, Dublin (IE)

(72) Inventors: James Rebbeor, Research Triangle Park, NC (US); Jeffrey A. Yuziuk, Research Triangle Park, NC (US); George Grady, Research Triangle Park, NC (US); Dennis McBride, Research Triangle Park, NC (US)

(73) Assignee: Grifols Worldwide Operations Limited, Dublin (IE)

( * ) Notice: Subject to any disclaimer, the term of this patent is extended or adjusted under 35 U.S.C. 154(b) by 661 days.

(21) Appl. No.: 17/904,355

(22) PCT Filed: Feb. 22, 2021

(86) PCT No.: PCT/EP2021/054302
§ 371 (c)(1),
(2) Date: Aug. 16, 2022

(87) PCT Pub. No.: WO2021/170531
PCT Pub. Date: Sep. 2, 2021

(65) Prior Publication Data
US 2024/0262889 A1 Aug. 8, 2024

Related U.S. Application Data

(60) Provisional application No. 62/981,410, filed on Feb. 25, 2020.

(51) Int. Cl.
*C07K 14/81* (2006.01)
*A61K 38/55* (2006.01)
*A61P 11/00* (2006.01)
*B01D 61/14* (2006.01)

(52) U.S. Cl.
CPC .................. *C07K 14/8125* (2013.01)

(58) Field of Classification Search
CPC .... C07K 14/8125; C07K 47/18; A61K 38/55; B01D 61/14; A61P 11/00
See application file for complete search history.

(56) References Cited

U.S. PATENT DOCUMENTS

| | | |
|---|---|---|
| 6,462,180 B1 | 10/2002 | Lebing et al. |
| 9,616,126 B2 | 4/2017 | Guo et al. |
| 2011/0237781 A1 | 9/2011 | Lebing et al. |
| 2020/0038494 A1 | 2/2020 | Rebbeor et al. |

FOREIGN PATENT DOCUMENTS

| | | |
|---|---|---|
| EP | 2690110 A1 | 1/2014 |
| JP | 2020-019765 | 2/2020 |
| WO | WO 2015/195453 A2 | 12/2015 |
| WO | WO 2019/177982 A1 | 9/2019 |

OTHER PUBLICATIONS

Kumar et al., "Purification of A1PI from Human Plasma—An Improved Process to Achieve Therapeutic Grade Purity", Journal of Chromatography & Separation Techniques, 6(4):277-286 (2015).
International Search Report and Written Opinion issued in international Application No. PCT/EP2021/054302, mailed on May 26, 2021.
Notice of Reasons for Refusal issued in Japanese Application No. 2022-549348, dated Jan. 7, 2025.

*Primary Examiner* — Maryam Monshipouri
(74) *Attorney, Agent, or Firm* — Knobbe, Martens, Olson & Bear, LLP

(57) ABSTRACT

A method for obtaining Alpha-1 Proteinase Inhibitor for obtaining highly-concentrated Alpha-1 Proteinase Inhibitor (A1PI) includes preparing a solution of A1PI by concentrating an initial solution of A1PI by tangential flow filtration (TFF) against water. The final concentration of A1PI in the concentrated solution is at least 110 mg/ml. The TFF can be carried out against water for injection (WFD).

13 Claims, No Drawings

METHOD FOR OBTAINING ALPHA-1 PROTEINASE INHIBITOR

BACKGROUND

Field

The present disclosure is related to the field of pharmaceutical products. Certain embodiments herein relate to methods for obtaining highly-concentrated Alpha-1 Proteinase Inhibitor (A1PI), which can be used for many therapeutic indications.

Description of the Related Art

Alpha-1-Proteinase inhibitor (A1PI), also known as Alpha-1-Antitrypsin (AAT) or $\alpha_1$-Antitrypsin, is a proteinase inhibitor that acts on a variety of cellular proteases. A1PI plays a major role in tissue homeostasis through the inhibition of neutrophil elastase action, and through other mechanisms.

Congenital deficiencies of A1PI allow uncontrolled activity of neutrophil elastase and the subsequent degradation of elastin, an essential protein that confers elasticity to tissues, particularly the lungs. The absence of elastin may result in respiratory complications such as pulmonary emphysema and hepatic cirrhosis.

Chronic intravenous (IV) administration of A1PI to treat AAT deficiency is burdensome, requires professional assistance (administered in the patient's home or in clinics, hospitals, etc.), and can cause immediate hypersensitive reactions. To overcome said problems, a new concentration process and a new formulation have been developed by the inventors for a novel product which comprises highly concentrated A1PI. The concentrated formulation detailed in the invention enables a broader spectrum of parenteral administration, which may include intravenous, subcutaneous, aerosol, and intradermal administration. This product could satisfy the long-standing unmet need to make dosing easier to administer by patients at home, without a supporting healthcare professional, thus reducing treatment costs, and is suitable for chronic treatment.

There are several purification methods of A1PI known in the prior art where the starting material is Cohn fraction IV-1 paste and precipitation agents like PEG and $ZnCl_2$ are added to precipitate impurities and A1PI. The precipitation methods suffer from low yields and less specific activity besides having an additional step included in the process in the form of filtration or centrifugation to separate the precipitate from the supernatant. The methods in which affinity chromatography are used are not suitable for therapeutic protein manufacture due to the strong possibility of ligand leaching.

Cohn's ethanol fractionation or affinity chromatography has been widely used to purify this protein in high yields. A more efficient process helps to ensure optimal use of a scarce and valuable commodity like human plasma to produce the end product of therapeutic grade.

One of the known methods used to produce A1PI comprise the use of tangential flow filtration (TFF) ultrafiltration, however only concentrations of A1PI up to 100 mg/mL (10% w/v) have been obtained. Attempts to increase the concentration of A1PI using conventional TFF ultrafiltration results in generation of unacceptable high level of aggregates even using small amount of buffers and salts. In order to achieve greater concentrations of A1PI, a further step, after the conventional TFF ultrafiltration has to be performed. In a known method, this further step may be a single-pass tangential flow filtration (SPTFF), which lead to concentrations of A1PI greater than 200 mg/ml (20% w/v).

The present inventors have surprisingly found that using conventional TFF ultrafiltration a concentration of A1PI at least 110 mg/mL against water for injection (WFI) can be obtained without using buffers and salts which allows to dispense with a later stage of further concentration of A1PI. After that, the A1PI is formulated to a final concentration between 100 mg/mL and 200 mg/mL with one or more uncharged excipients. This enabled formulation of a concentrated A1PI with uncharged excipients to adjust osmolality, while addressing previous poor stability performance with charged excipients.

SUMMARY

An embodiment of the present invention is that the use of conventional TFF ultrafiltration could concentrate A1PI at least 110 mg/mL against water and then formulate A1PI to a final concentration of 100 mg/mL and 200 mg/mL.

In some embodiments, a method for preparing a solution of A1PI by conventional TFF ultrafiltration is carried out against water for injection (WFI).

In some embodiments, a method for preparing a concentrated solution of A1PI comprises after the TFF step a formulation with one or more uncharged excipients selected from the list consisting of sorbitol, serine, trehalose, alanine, sucrose, and mannitol, and combinations thereof. Preferably, the one or more uncharged excipients are alanine, sorbitol or trehalose and combinations thereof.

In some embodiments, a method for preparing a concentrated solution of A1PI comprises after the TFF step a formulation with one or more uncharged excipients with a concentration between 0.01 and 0.3 M. Preferably, the concentration of one or more uncharged excipients is between 0.10 and 0.20 M. More preferably, the concentration of one or more uncharged excipients is 0.17 M.

pH is controlled to near neutral (around 6.6 to 7.4) without the use of buffers, but through addition of formulation excipient(s), and remains stable throughout storage. Preferably, the pH of the composition is 7.0.

In some embodiments, a method for preparing a concentrated solution of A1PI wherein the osmolality of the solution is between 200 mOsm/Kg and 410 mOsm/Kg. In some embodiments, the osmolality of the solution is about 200, 240, 270, 300, 330, 360, 390 or 410 mOsm/Kg, or within a range defined by any two of the aforementioned values. Preferably, the osmolality of the solution is 300 mOsm/Kg.

In some embodiments, a method for preparing a concentrated solution of A1PI comprises a step of formulation. In some embodiments, the concentration of A1PI after formulation is between 100 mg/ml and 200 mg/mL.

DETAILED DESCRIPTION

Currently, A1PI solutions are commercially available (Prolastin-C, Grifols; Glassia, Shire; Zemaira, CSL; Aralast, Baxter) to treat human congenital deficiency of the protein (Alpha-1 Antitrypsin Deficiency, AATD). One limitation that all these products have in common is that they contain A1PI at relatively low concentrations (about 20 to 50 mg/ml). For this reason, their only suitable route of administration as a therapeutic has been weekly intravenous injection.

Chronic intravenous administration of A1PI to treat AATD is burdensome, requires professional assistance, and can cause immediate hypersensitive reactions. Therefore, there is a longstanding unmet need to make dosing easier to administer by patients at home without an assisting healthcare professional, which would considerably reduce treatment costs and would make it suitable for chronic treatment. In order to enable a wider range of parenteral administration routes, the concentration of A1PI in the products should be increased. However, it is not possible to produce stable concentrated liquid A1PI based on the current methods of A1PI purification, with existing formulations.

Surprisingly, the inventors found that using conventional TFF ultrafiltration against water allows the production of highly-concentrated A1PI of at least 110 mg/ml without the use of buffers and salts or further steps such as SPTFF. The novelty of this step of the process is that it had to be performed in the absence of buffers and salts, in the presence of WFI and formulated later on by addition of one or more uncharged excipients selected from the list consisting of sorbitol, serine, trehalose, alanine, sucrose, and mannitol, and combinations thereof, more preferably alanine, sorbitol or trehalose and combinations thereof. Importantly, the resulting compositions are suitable for human administration since they comply with the values of osmolality, stability, and viscosity required by the regulatory agencies.

Methods of Preparing Concentrated A1PI Solution

An embodiment of the present invention discloses a method for preparing a composition of A1PI is provided. The method comprises a step of preparing a solution of A1PI by concentrating an initial solution of A1PI by tangential flow filtration (TFF) against water wherein the final concentration of A1PI in the concentrated solution is at least 110 mg/ml.

An embodiment of the present invention discloses a method for preparing a composition of A1PI, where said step of TFF is carried out against water for injection (WFI).

In some embodiments, the method comprises concentrating a solution of A1PI, where the final concentration of A1PI in the concentrated solution is between 110 mg/ml and 220 mg/ml. In some embodiments, the final concentration of A1PI in the concentrated solution is about 110, 130, 150, 180, 200 or 220 mg/ml, or within a range defined by any two of the aforementioned values.

In some embodiments, a method for preparing a concentrated solution of A1PI comprises, after the TFF step, the solution of A1PI is formulated with one or more uncharged excipients selected from the group consisting of amino acids, sugars, and polyols, including sorbitol, serine, trehalose, alanine, sucrose, and mannitol, and combinations thereof. Preferably, the solution of A1PI is formulated with one or more uncharged excipients selected from the group consisting of alanine, sorbitol or trehalose and combinations thereof.

In some embodiments, a method for preparing a concentrated solution of A1PI comprises after the TFF step a formulation with one or more uncharged excipients in a concentration between 0.01 and 0.3 M. Preferably, the concentration of one or more uncharged excipients is between 0.10 and 0.20 M. More preferably, the concentration of one or more uncharged excipients is 0.17 M.

pH is controlled to near neutral (around 6.6 to 7.4) without the use of buffers, but through addition of formulation excipient(s), and remains stable throughout storage. Preferably, the pH of the composition is 7.0.

In some embodiments, a method for preparing a concentrated solution of A1PI where the osmolality of the solution is between 200 mOsm/Kg and 410 mOsm/Kg. In some embodiments, the osmolality of the solution is about 200, 240, 270, 300, 330, 360, 390 or 410 mOsm/Kg, or within a range defined by any two of the aforementioned values. Preferably, the osmolality of the solution is 300 mOsm/Kg.

In some embodiments, a method for preparing a concentrated solution of A1PI comprises a step of formulation. In some embodiments, the concentration of A1PI after formulation is between 100 mg/ml and 200 mg/mL.

EXAMPLES

Example 1—High Concentration A1PI Process Flow According to the Prior Art

Alpha-1 MP (U.S. Pat. No. 6,462,180 B1), Liquid Alpha (U.S. Pat. No. 9,616,126 B1), and Alpha-1 HC (US 20110237781 A1) processes make A1PI up to 50 mg/ml using a typical recirculating (TFF) UF step to concentrate, followed by a diafiltration (DF) step with water to remove buffer salts to prepare bulk for final formulation and adjustment to 50 mg/ml of protein. The formulation consists of a 20 mM sodium phosphate buffer to maintain pH, and either a salt (Alpha-1 MP and Alpha-1 HC; 100 mM or 150 mM NaCl, respectively) or amino acid (Liquid Alpha; 200 to 300 mM alanine) to adjust osmolality to isotonic conditions of 200-410 mOsm/kg. Likewise, other A1PI formulations are similarly prepared (Table 1).

TABLE 1

A side by side comparison of several A1PI preparations, with concentration and formulations.

| Grifols; 2002 U.S. Pat. No. 6,462,180 Prolastin-C | ARC; 2000 U.S. Pat. No. 6,093,804 | Kamada; 2011 U.S. Pat. No. 7,879,800 Glassia | CSL; 2012 U.S. Pat. No. 8,124,736 Zemaira | Alpha Therapeutics 1999 U.S. Pat. No. 5,981,715 Aralast |
|---|---|---|---|---|
| 50 mg/ml; 0.02M NaP, 0.1M NaCl, pH 6.6-7.4 | 10-20 mg/ml; 0.02M NaP, 0.1M NaCl, pH 6.8-7.0 | 20-40 mg/ml; 0.02M NaP, 0.1M NaCl, pH 6.5-7.5 | 50 mg/ml; 0.02M NaP, 0.045M NaCl, 3% mannitol, pH 6.6-7.4 | 20 mg/ml; 0.02M NaP, 0.1M NaCl, pH 8.0 |

In contrast to the prior art methods, in the present invention, it is not necessary to use buffers and salts to obtain concentrations of A1PI of >100 mg/ml after formulation. The concentration of AlP1 is greater than 110 mg/ml after ultrafiltration, and with subsequent addition and mixing of excipients and pH adjustments concentrations of A1PI of >100 mg/ml can be obtained.

Example 2—Characteristics of Method of Producing A1PI Using Single-Pass Tangential Flow Filtration (SPTFF) and Conventional TFF Ultrafiltration Table 2 shows that characteristics of compositions of A1PI, obtained by the method of the present invention using TFF ultrafiltration, were not different from those obtained using a further step of SPTFF. For example, the potency and the specific activity of A1PI obtained by both methods are similar. On the other hand, the pH is in all cases about 7 and the osmolality is about 300 mOsm/kg. On the other hand, the percentage of aggregates were lower than 0.1 using both methods. Therefore, there are no significant differences on A1PI preparations obtained by using an additional step of SPTFF and the method of the present invention.

TABLE 2

A side by side comparison of SPTFF and conventional TFF ultrafiltration for obtaining A1PI preparations.

|  | SPTFF (prior art) | | | TFF (present invention) Pilot Scale (15%) |
| --- | --- | --- | --- | --- |
|  | Pilot Scale (20%) | Pilot Scale (15%) | Clinical Scale (15%) | |
| Protein concentration (mg/mL) | 188.96 | 147.84 | 151.39 | 151.77 |
| Potency (mg/mL) | 200.68 | 157.16 | 163.18 | 164.06 |
| Specific Activity | 1.06 | 1.06 | 1.08 | 1.08 |
| pH | 7.0 | 7.0 | 6.9 | 7.0 |
| Osmolality (mOsm/kg) | 274 | NT | 312 | 309 |
| Alanine concentration (mM) | 120 | 170 | 179 | 181 |
| Aggregate % | <0.1 | <0.1 | <0.1 | <0.1 |
| Oligomer % | 2.29 | 3.87 | 0.86 | 1.96 |
| Monomer % | 97.57 | 96.14 | 99.15 | 98.04 |

* The values represents an average for N = 3

Example 3—Highly Concentrated A1PI Obtained by TFF Ultrafiltration

A method to achieve compositions comprising highly concentrated A1PI, which could be used for many therapeutic indications, includes the application of conventional TFF ultrafiltration.

In table 3, the first three columns (batches P14-26; P15-10 and P15-22) were prepared using conventional TFF ultrafiltration in WFI whereas the last column represents the mean of three batches of A1PI obtained by using a further step of SPTFF in WFI, prior to formulation. Concentrations of A1PI obtained using conventional TFF ultrafiltration were not significantly different from those obtained using SPTFF. Moreover, the potency, the specific activity and the molecular weight of A1PI obtained by both methods are very similar.

TABLE 3

A side by side comparison of SPTFF and conventional TFF ultrafiltration for obtaining A1PI preparations.

|  | Batch P14-26 (present invention) | Batch P15-10 (present invention) | Batch P15-22 (present invention) | Consistency batches using SPTFF |
| --- | --- | --- | --- | --- |
| Total protein (mg/mL) | 188.68 | 187.38 | 189.41 | 205.56 ± 11.09 (173-239) |
| Alpha potency (mg/mL) | 212.44 | 211.13 | 210.26 | 220.92 ± 3.92 (209-233) |
| Specific activity | 1.13 | 1.13 | 1.11 | 1.07 ± 0.04 (0.95-1.19) |
| Molecular weight analysis Monomer % | 97.93 | 98.09 | 98.15 | 99.08 ± 0.06 (98.96-99.20) |

* Analytical Data, Mean ± 1 SD, Range ± 3 SD for N = 3

Example 4—Protein Concentration of A1PI Using Alanine as Uncharged Excipient in the Step of Formulation According the Method of the Present Invention In the method of the present invention, after the TFF step the solution of A1PI is precisely diluted to a target concentration (at least 10% (w/v)) with a concentrated excipient solution to accomplish osmolality and pH adjustment formulated with one or more uncharged excipients. This process enables high A1PI concentrations to be achieved, while stable formulations of the liquid drug product result without the use of buffers, salts, or surfactants.

Table 4 shows preparations of A1PI after formulation containing different concentrations of alanine. Some parameters, such as osmolality, total protein and DLS temperature of unfolding and DLS radius of folded protein were evaluated.

The osmolality control using alanine compensate at the lower protein concentration according to results of Table 4, showing a direct and linear relationship between the concentration of A1PI (142 mg/mL) osmolality versus the amount of alanine added. DLS showed no effect on A1PI stability over the range of alanine tested.

TABLE 4

A1PI preparations with concentration and formulations containing alanine as an uncharged excipient.

| Sample | Alanine (mM) | Osmolality (mOsmo/kg) | Total protein (%) | DLS Temperature of unfolding (Celsius) | DLS Radius of folded protein (nm) |
| --- | --- | --- | --- | --- | --- |
| 1M alanine | 1120 | N/T | N/A | N/A | N/A |
| 22% alpha in water ( N = 1) | 0 ± 0 | 134 | 20.8 | 52 | 2.1 |
| 15% alpha 100 mM alanine | 113 ± 0 | 205 ± 2 | 14.1 ± 1 | 52 ± 1 | 1.9 ± 0.2 |
| 15% alpha 135 mM alanine | 150 ± 2 | 254 ± 4 | 14.1 ± 1 | 54 ± 1 | 2.0 ± 0.1 |
| 15% alpha 170 mM alanine | 188 ± 3 | 302 ± 8 | 14.2 ± 1 | 54 ± 1 | 2.0 ± 0.2 |
| 15% alpha 205 mM alanine | 234 ± 3 | 354 ± 1 | 14.2 ± 0 | 54 ± 0 | 2.0 ± 0.1 |
| 15% alpha 240 mM alanine | 268 ± 0 | 392 ± 5 | 14.2 ± 0 | 54 ± 1 | 2.0 ± 0.1 |

*N/A = Not Applicable; N/T = Not Tested
** Analytical Data, Mean ± 1 SD for N = 3

Definitions

As used herein, the section headings are for organizational purposes only and are not to be construed as limiting the described subject matter in any way. All literature and similar materials cited in this application, including but not limited to, patents, patent applications, articles, books, treatises, and internet web pages are expressly incorporated by reference in their entirety for any purpose. When definitions of terms in incorporated references appear to differ from the definitions provided in the present teachings, the definition provided in the present teachings shall control. It will be appreciated that there is an implied "about" prior to the temperatures, concentrations, times, etc. discussed in the present teachings, such that slight and insubstantial deviations are within the scope of the present teachings herein.

In this application, the use of the singular includes the plural unless specifically stated otherwise. Also, the use of "comprise", "comprises", "comprising", "contain", "contains", "containing", "include", "includes", and "including" are not intended to be limiting.

As used in this specification and claims, the singular forms "a," "an" and "the" include plural references unless the content clearly dictates otherwise.

As used herein, "about" means a quantity, level, value, number, frequency, percentage, dimension, size, amount, weight or length that varies by as much as 20, 15, 10, 9, 8, 7, 6, 5, 4, 3, 2 or 1% to a reference quantity, level, value, number, frequency, percentage, dimension, size, amount, weight or length.

Although this disclosure is in the context of certain embodiments and examples, those skilled in the art will understand that the present disclosure extends beyond the specifically disclosed embodiments to other alternative embodiments and/or uses of the embodiments and obvious modifications and equivalents thereof. In addition, while several variations of the embodiments have been shown and described in detail, other modifications, which are within the scope of this disclosure, will be readily apparent to those of skill in the art based upon this disclosure.

It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes or embodiments of the disclosure. Thus, it is intended that the scope of the present disclosure herein disclosed should not be limited by the particular disclosed embodiments described above.

It should be understood, however, that this detailed description, while indicating preferred embodiments of the disclosure, is given by way of illustration only, since various changes and modifications within the spirit and scope of the disclosure will become apparent to those skilled in the art.

The terminology used in the description presented herein is not intended to be interpreted in any limited or restrictive manner. Rather, the terminology is simply being utilized in conjunction with a detailed description of embodiments of the systems, methods and related components. Furthermore, embodiments may comprise several novel features, no single one of which is solely responsible for its desirable attributes or is believed to be essential to practicing the embodiments herein described.

In the present document, the term Tangential Flow Filtration (TFF), refers to steps to concentrate product through volume reduction, and buffer exchange through diafiltration. TFF typically utilizes ultrafiltration membranes ranging from 1-1000 kDa nominal molecular weight limit (NMWL) to retain different size molecules. Traditional TFF requires multiple passes through a system, using a pump to drive feed through a filter and sending the retentate back to a tank for another pass through the system.

In the present document, the term Single-pass tangential flow filtration (SPTFF) refers to a filtration method utilizing a longer feed channel path to reach the desired conversion after one pump pass. The absence of a recirculation loop allows the retentate to flow downstream and, as a result, reduce hold-up volumes, eliminate pool tank requirements and enable continuous processing.

What is claimed is:

1. A method for preparing a composition of alpha-1 proteinase inhibitor (A1PI) comprising:
   preparing a solution of A1PI by concentrating an initial solution of A1PI by tangential flow filtration (TFF) against water,
   wherein a final concentration of A1PI in the concentrated solution is between 110 mg/ml and 220 mg/ml,
   wherein said method does not comprise a further step of Single Pass Tangential Flow Filtration (SPTFF) after the tangential flow filtration (TFF) against water.

2. The method for preparing the composition according to claim 1, wherein said TFF is carried out against water for injection (WFI).

3. The method for preparing the composition according to claim 1, wherein the final concentration of A1PI in the concentrated solution is 110, 130, 150, 180, 200 or 220 mg/ml, or within a range defined by any two of the aforementioned values.

4. The method for preparing the composition according to claim 1, wherein after the TFF, the solution of A1PI is formulated with one or more uncharged excipients selected from the list consisting of sorbitol, serine, trehalose, alanine, sucrose, and mannitol, and combinations thereof.

5. The method for preparing the composition according to claim 4, wherein after the TFF, the solution of A1PI is formulated with sorbitol, trehalose, alanine, or a combination thereof.

6. The method for preparing the composition according to claim 1, wherein one or more uncharged excipients are in a concentration between 0.01 and 0.3 M.

7. The method for preparing the composition according to claim 6, wherein one or more uncharged excipients are in a concentration between 0.10 and 0.20 M.

8. The method for preparing the composition according to claim 1, wherein the pH is between 6.6 and 7.4.

9. The method for preparing the composition according to claim 8, wherein the pH is 7.0.

10. The method for preparing the composition according to claim 1, wherein the osmolality is between 200 mOsm/Kg and 410 mOsm/Kg.

11. The method for preparing the composition according to claim 10, wherein the osmolality is 300 mOsm/Kg.

12. The method for preparing the composition according to claim 1, wherein the method further comprises formulating the concentrated solution with one or more uncharged excipients.

13. The method for preparing the composition according to claim 12, wherein the final concentration of A1PI after formulating the concentrated solution is between 100 mg/ml and 200 mg/ml.

* * * * *